2,888,494
PURIFICATION OF TRICHLOROETHYLENE

Lehr F. Kissling, Wadsworth, Ohio, assignor to Columbia-Southern Chemical Corporation, Allegheny County, Pa., a corporation of Delaware No Drawing. Application October 21, 1954
Serial No. 463,799

6 Claims. (Cl. 260—654)

The present invention relates to the manufacture of halogenated hydrocarbons, more particularly being concerned with the purification of halogenated aliphatic hydrocarbons such as trichloroethylene. It has further relation to neutralization of unsaturated chlorinated hydrocarbons.

Halogenated hydrocarbons such as the unsaturated chlorinated hydrocarbons are useful for a variety of purposes. However, in many instances, the presence of acidity is a serious deterrent in these uses. Trichloroethylene is a valuable commercial solvent and finds wide application as a dry cleaning and degreasing agent. For example, in the dry cleaning of garments, rugs, and various other textiles, the presence of acidity in the dry cleaning solvent is undesirable, apparently causing serious damage to the cleaned material.

According to the present invention, halogenated hydrocarbons, notably trichloroethylene, may be treated in a simple and efficient manner to remove or reduce its acidity. Thus, it has been found that by passing an acidic halogenated hydrocarbon into contact with a synthetic, organic, carbonaceous ion-exchange resin the acidity of the halogenated hydrocarbon may be reduced substantially or removed. Benefits are provided thereby, not achieved by merely washing the halogenated hydrocarbon with an aqueous alkaline solution such as sodium hydroxide or calcium hydroxide.

Although the present invention is not to be construed as limited to the following theoretical explanation, it appears that the acidity of chlorinated unsaturated hydrocarbons such as trichloroethylene results from at least three types of aciduous materials. One type of acidity is due to inorganic or mineral acidity, notably hydrogen chloride. Simple washing with water or aqueous alkaline solutions or dispersions at least partially removes such acidity. However, the other two or more types of acidity present apparently are not materially effected by water washing or treatment with aqueous alkaline materials. It is believed this remaining acidity in the chlorinated hydrocarbons is caused by (1) organic acids which are insoluble or only slightly soluble in aqueous solutions and (2) acid-forming organic materials insoluble or only slightly soluble in aqueous solutions. It is in connection with partial or complete removal or organic aciduous materials that the present invention is particularly advantageous, although treatment of the halogenated hydrocarbon with a synthetic carbonaceous ion-exchange resin will also remove inorganic mineral acids.

Thus, in accordance with this invention, halogenated hydrocarbons may be treated with synthetic carbonaceous ion-exchange resins to reduce or remove materials which impart acidity. In this connection, a variety of procedural expedients which involve intimately contacting an appropriate synthetic ion-exchange resin with acidic halogenated hydrocarbon and thereafter permit recovery thereof apart from the resin, such as simple separation, are within the scope of the present invention. By such processes, an essentially neutral chlorinated hydrocarbon of pH between 6 and 8, notably pH 7, may be obtained.

In practice a liquid permeable bed of the synthetic carbonaceous ion-exchange resin is usually established, such as by packing a suitable column with the resin. The halogenated hydrocarbon is then flowed through the ion-exchange bed until regeneration or reactivation of the bed is indicated because of its diminished ability to remove the aciduous components of the halogenated hydrocarbon. Subsequent to discontinuing the flow of halogenated hydrocarbon, the bed may be regenerated by treatment with water, or more preferably an aqueous solution of an alkaline material such as aqueous sodium hydroxide, sodium hypochlorite, or the like. At the conclusion of the regeneration cycle, the flow of acidic halogenated hydrocarbons may be resumed again until regeneration is required. As can be seen, cyclic operation for a single bed of catalyst can be employed.

Alternate passage of acidic halogenated hydrocarbons and regenerating media through the ion-exchange bed is often conducted by countercurrent flow of the respective liquids. For example, the halogenated hydrocarbon may be passed uni-directionally and downwardly through a vertically disposed bed of the ion-exchange materials until the acidity of the halogenated hydrocarbon is no longer being reduced, or more preferably until the efficiency of the ion-exchange bed is below optimum. Then, after halting the flow of the halogenated hydrocarbon and preferably draining or removing most or all of the halogenated hydrocarbon which may be momentarily trapped in the bed, the regenerating medium is passed upwardly through the bed. The regeneration is continued until the resin is again capable of removing the aciduous components of halogenated hydrocarbons whereafter, the flow of halogenated hydrocarbon is commenced. Prior to commencing the flow of halogenated hydrocarbon, it may be advisable to dry the bed, such as by blowing air or like inert gas therethrough.

According to a further technique for utilizing ion-exchange beds in the contemplated invention, at least a pair of ion-exchange resinuous beds may be provided in order to provide a continuous technique for conducting the aforedescribed cyclic operation. By employing at least two beds, one may be "on stream" and treating the halogenated hydrocarbon while the other is being regenerated. While the "on stream" bed is decreasing in activity, the second bed is undergoing regeneration and will be available, while the first needs regeneration. Depending on the relative rates of flow, two or more beds may be employed in the above general manner in order to continuously treat the halogenated hydrocarbon.

Of course, the specific ion-exchange resin employed, the rate of the acidic material, and the concentration of acidic material in the halogenated hydrocarbon all govern the frequency with which the regeneration cycle is necessitated. Different ion-exchange resins have different capacities for removing the acidic constituents or impurities of the halogenated hydrocarbons. Usually, the capacity of the bed, or the capacity of the ion-exchange resins based on the ability of a cubic foot thereof to absorb a given quantity of acidic impurity is predetermined, as by simple small scale tests, and are thereafter operated in a manner consistent with such determinations. The ion-exchange resins may be regenerated, and consequently used to purify or treat halogenated hydrocarbons for long periods of time. By adequate regeneration, the life of the ion-exchange resins may be extended to such an extent that the major limiting factors are usually the gradual physical deterioration of the resin, either by loss of the porosity, gradual physical disintegration and loss from the bed as fines, or the like.

In an illustrative operation, the bed of ion-exchange resin is composed of a large mass of individual beads of the resin, usually ranging from about 10 to about 100 mesh in size, and preferably 20 to 50 mesh. A bed composed of resin beads, the majority of which are in this size, is effectively handled in a tower with the bed disposed in a tubular, or like container. However, the ion-exchange synthetic resin may be in any form which provides a liquid permeable bed.

Contact with the ion-exchange resin bed of the halogenated hydrocarbons is accomplished over a wide range of temperatures, normal atmospheric temperatures being convenient and appropriate. Usually preferable, is operation at temperatures which are substantially below the boiling point of the halogenated hydrocarbon, particularly minimize potential loss resulting from vaporization and the necessity for extensive gas tight equipment. Temperatures between about 10° C. and a maximum of about 70° C. are those most frequently employed. Except for providing pressure differentials which facilitate passage of the chlorinated hydrocarbon through the resin, essentially atmospheric pressures are convenient, although both superatmospheric and subatmospheric pressures may be used.

A large number of synthetic carbonaceous organic ion-exchange resins which are inert with respect to the chlorinated hydrocarbon are useful for the purpose of this invention. Some such ion-exchange resins are peculiarly advantageous with specific halogenated hydrocarbons, and as will hereinafter be explained, are therefore recommended for removing aciduous materials from a particular halogenated hydrocarbon. Typical of synthetic carbonaceous ion-exchange resins which are useful include those produced by sulfonation of polystyrene and copolymers of styrene with vinyl benzene. See for example, U.S. Patents 2,366,077, 2,631,127, etc. Other sulfonated soluble materials of high molecular weight such as sulfonated phenol-formaldehyde resins and modified sulfonated phenol-formaldehyde resins may be used.

Anion-exchange resins useful for the herein described purposes include the amino and like nitrogenous resins such as those derived from styrene and its copolymers. Typical anion-exchange resins of this character are described in U.S. Patent 2,591,573. Also useful are the anion-exchange resins, prepared for example, by reacting the ammonia or a primary or a secondary amine with an insoluble, cross-linked polymer of a glycidyl ester of acrylic acid or of an alpha-substituted acrylic acid such as alpha-methyl acrylic acid. Anion-exchange resins of this character are illustrated in U.S. Patent 2,630,429.

Both anion and cation exchange resins may be utilized. Strongly basic and weakly basic anion-exchange resins are included and are employed for the most part in their hydroxyl or basic form. Also, both weakly and strongly acidic cation-exchange resins used in their hydrogen or acid form are included.

Halogenated hydrocarbons treated in accordance with the present invention usually contain from 1 to 5 carbon atoms, and most frequently contain 2 or 3 carbon atoms. The process has been found most effective in removing the acidity from chlorinated hydrocarbons containing 2 or 3 carbon atoms, and more especially those liquid chlorinated hydrocarbons which are unsaturated, such as trichloroethylene. The removal of aciduous materials from such unsaturated chlorinated hydrocarbons by the present invention finds particular favor since such removal has heretofore constituted a peculiarly difficult problem. However, other chlorinated hydrocarbons, notably normally liquid chlorinated hydrocarbons such as carbon tetrachloride, chloroform, the chlorinated propanes, etc., which contain acidic contaminants are susceptible to treatment by recourse to the present invention. Corresponding chlorinated, iodonated, and brominated hydrocarbons, as well as mixed halogenated hydrocarbons, e.g. chloro-fluoro-containing hydrocarbons are also used.

Again, it should be appreciated that the optimum synthetic ion-exchange resin to be used in conjunction with a specific halogenated hydrocarbon will vary depending on the halogenated hydrocarbon. Also, the optimum conditions for conducting this invention and passing the acid-containing halogenated hydrocarbons through the bed varies somewhat.

According to this invention, trichloroethylene is treated according to the general principles as hereinbefore outlined, with a weakly basic phenol-formaldehyde type resin in its hydroxyl form. This treatment is most effective when the resin is air dried, or in an equivalent reduced moisture condition. In order to achieve and maintain this minimum moisture content in the resin, it has been found beneficial to pre-dry the trichloroethylene. This may be effected by any of a number of recognized techniques, such as passage of the trichloroethylene through a calcium chloride dryer or by contacting it with solid sodium hydroxide, or other hygroscopic material not reactive with the trichloroethylene. For the most part, the trichloroethylene may be so dried until it contains less than 100 parts per million of water, and preferably less than 10 parts per million of water by weight.

In addition, it has been found especially advantageous to regenerate the ion-exchange resin bed in conjunction with the purification of trichloroethylene under limited conditions. Thus, after regenerating the bed with either water or an aqueous alkaline media, the bed is preferably dried to remove moisture taken up during regeneration. In one preferred technique, subsequent to regeneration with the aqueous medium, the bed is dried by passing a low boiling, water miscible organic compound such as methanol through the bed. Thereafter, the bed is further dried by passage of an inert gaseous material such as air, nitrogen or neon therethrough. Besides methanol, other oxygen-containing organic compounds which are low boiling and miscible with water may be used including other alcohols such as methanol, isopropanol, and butanol, etc., as well as the lower boiling ketones including acetone, methyl ethyl ketone, etc. These organic oxygen-containing compounds should of course be inert with respect to the ion-exchange resins.

Thus, in treatment of trichloroethylene, the resin bed is employed in its apparently dry condition. This state of dryness can be visually observed by a slight but distinct color change in the bed as moisture is removed. Apparently dry resins, as herein contemplated, contain less than 20 percent water by weight at atmospheric temperature and pressure. Resin beds containing between about 10 and 20 percent water by weight are therefore preferably used to treat trichloroethylene.

Acidity of the halogenated hydrocarbons treated according to the present invention may be determined by specific techniques. Thus, one measurement of a halogenated hydrocarbon's acidity involves adding 100 milliliters of neutral water to 100 milliliters of the halogenated hydrocarbon and shaking for 5 or 10 minutes. Thereafter, the aqueous phase is separated and the pH determined. Since at low pH, the quantitative amount of acidity present is not indicated by pH alone, the aqueous phase is titrated to 7 pH with 0.01 N NaOH. The latter measurement (or titer) is a more quantitative indicia of acidity. Halogenated hydrocarbons having a pH below about 4.0 and more usually below about 3.5 are those usually treated. Besides being below about 4.0 pH, the treated halogenated hydrocarbons usually have that quantity of acidity which requires at least about 5 milliliters of 0.01 normal NaOH to titrate them to neutrality in accordance with the above procedure. Quite frequently, the acidity of the halogenated hydrocarbons ranges from 10 to 400 milliliters of 0.01 N NaOH prior to contact with the ion-exchange resin. By virtue of this treatment it is possible to reduce the acidity, as indicated by the amount of 0.01 normal NaOH required to bring the aqueous phase to neutrality and/or to raise the pH of the solution from below 3.5 or 4.0 to from between 6.0 and 8.0. Frequently, under optimum conditions the treated stream of halogenated hydrocarbons is essentially neutral, e.g. at pH 7.

Regeneration of the ion-exchange resins is effected by contacting the ion-exchange resin with either water or aqueous alkaline media. Aqueous alkaline solutions containing sodium hydroxide, potassium hydroxide, sodium hypochlorite, potassium hypochloride, sodium carbonate, etc. are used. Generally, the alkaline solutions are dilute containing from 1 to 15 percent by weight of the alkaline materials.

The following examples are illustrative:

EXAMPLE I

The resin bed employed in these experiments was provided by placing sufficient ion-exchange resin (20 to 50 mesh beads) in a vertically disposed four foot section of one inch diameter glass pipe to fill approximately 36 inches of the pipe. Glass wool plugs at either end of the bed served to hold it in place. The anion-exchange resins employed were Amberlite IRA 410 or IRA 400, strongly acidic polystyrene quaternary amine type resins in their hydroxyl form, both manufactured by Rohm & Haas Company.

Trichloroethylene obtained by dehydrochlorinating tetrachloroethane and double fractionating the reaction crude was passed into the bottom of the bed. Table I tabulates the conditions and results.

*Table I*

| Resin | Influent | | Effluent | |
|---|---|---|---|---|
| | pH | Titer | pH | Titer |
| IRA 410 | 2.0 | 350.0 | 3.5 | 5.5 |
| IRA 410 | 3.0 | 10.2 | 4.0 | 1. |
| IRA 410 | 2.8 | 34.0 | 3.5 | 3.0 |
| IRA 410 | 2.0 | 75.0 | 3.5 | 4.0 |
| IRA 400 | 2.0 | 48.0 | 3.7 | 1.7 |
| IRA 400 | 2.0 | 200.0 | 3.4 | 5.2 |
| IRA 400 [1] | 3.2 | 5.0 | 7.0 | 1.2 |
| IRA 400 [2] | 1.8 | 76.0 | 3.5 | 4.5 |
| IRA 400 [2] | 4.2 | 6.0 | 4.6 | 1.2 |
| IRA 400 [2] | 3.6 | 35.0 | 5.8 | 8.0 |

[1] This resin bed was regenerated by washing with aqueous NaOH containing 12 percent NaOH by weight and 45 percent aqueous triethanolamine.
[2] These resin beds were dried by blowing air therethrough.

EXAMPLE II

Using the apparatus described in Example I and following the same general procedure except that Amberlite IR 45, a commercial weakly basic phenyl-formaldehyde type anion-type resin in the hydroxyl form marketed by Rohm & Haas, was employed to treat trichloroethylene. Starting with run 5, in Table II below, the resin was dried after regeneration with 12 percent aqueous NaOH. Drying was accomplished by passing through the bed a quantity of methanol equivalent to two volumes of the bed and thereafter blowing dry air therethrough for at least 4 hours. After drying, the resin bed was flooded with trichloroethylene, and all gas pockets removed before any of the fluid was taken off as product.

The following is a tabulation of the pertinent data:

*Table II*

| Run No. | Influent | | Effluent | |
|---|---|---|---|---|
| | pH | Titer [1] | pH | Titer [1] |
| 1 | 2.0 | 17.0 | 3.5 | 6.0 |
| 2 | 4.4 | 0.9 | 6.0 | 0.3 |
| 3 | 3.0 | 6.0 | 4.8 | 0.5 |
| 4 | 3.0 | <25.0 | 3.4 | 5.2 |
| 5 | 3.4 | 2.2 | 3.9 | 0.8 |
| 6 | 3.2 | 5.0 | 5.4 | 0.8 |
| 7 | 2.0 | 64.0 | 4.2 | 6.0 |
| 8 | 6.5 | 5.2 | 6.8 | 1.2 |
| 9 | 3.3 | 12.5 | 7.0 | None |
| 10 | 3.0 | 15.0 | 6.8 | None |
| 11 | 3.7 | 1.7 | 6.8 | None |
| 12 | 3.7 | 5.7 | 7.0 | None |
| 13 | 3.5 | 3.6 | 7.0 | None |
| 14 | 4.9 | 1.4 | 7.0 | None |
| 15 | <3.0 | >25.0 | 5.9 | 0.3 |

[1] As defined hereinbefore.

If desirable, the fractionated trichloroethylene obtained directly from the manufacturing operation may be first treated with caustic or other alkaline materials such as calcium hydroxide to reduce its acidity, and/or even slightly raise its pH. This pretreatment often is economically valuable, removing a large portion or substantially all of the inorganic acid that may be present in the halogenated hydrocarbons. By so pretreating the halogenated hydrocarbon, the synthetic ion-exchange resin bed may be more fully utilized to remove other otherwise unremoved contaminants.

Although the present invention has been described with reference to specific details of certain embodiments, it is not intended that the invention be construed as being limited thereto except insofar as defined in the appended claims.

I claim:

1. The method which comprises sequentially passing acidic trichloroethylene containing acidity not materially affected by treatment with aqueous alkaline materials through a liquid permeable dried bed of synthetic, organic anionic ion-exchange resin whereby to reduce said acidity and contents of aciduous materials not affected by treatment with aqueous alkaline materials, discontinuing the passage of trichloroethylene when the activity of the resin bed diminishes, regenerating the resin bed by contacting it with an aqueous alkaline medium, drying the regenerated bed to remove moisture and to establish a bed containing less than 20 percent water by weight, and thereafter resuming the passage of acidic trichloroethylene through the bed.

2. The method of claim 1 wherein the said aqueous alkaline materials comprise sodium hydroxide solutions.

3. The method which comprises sequentially passing acidic trichloroethylene containing acidity not materially affected by treatment with aqueous alkaline materials through a liquid permeable bed of synthetic, organic anionic ion-exchange resin whereby to reduce said acidity and contents of aciduous materials not affected by treatment with aqueous alkaline materials, discontinuing the passage of trichloroethylene when the activity of the resin bed diminishes, regenerating the resin bed by contacting it with an aqueous alkaline medium, drying the regenerated bed by contacting the bed with a low boiling, liquid, organic oxygen-containing organic compound, and thereafter passing an inert dry gas through the bed and thereafter resuming the passage of acidic trichloroethylene through the bed.

4. The method which comprises sequentially passing acidic trichloroethylene containing acidity not materially affected by treatment with aqueous alkaline materials through a liquid permeable bed of synthetic, organic anionic ion-exchange resin whereby to reduce said acidity and contents of aciduous materials not affected by treatment with aqueous alkaline materials, discontinuing the passage of trichloroethylene when the activity of the resin bed diminishes, regenerating the resin bed by contacting it with an aqueous alkaline medium, drying the regenerated bed by contacting the bed with a lower aliphatic alcohol, and thereafter passing an inert dry gas through the bed and thereafter resuming the passage of acidic trichloroethylene through the bed.

5. The method which comprises sequentially passing acidic trichloroethylene containing acidity not materially affected by treatment with aqueous alkaline materials through a liquid permeable bed of a weakly basic phenolformaldehyde resin in its hydroxyl form whereby to reduce this acidity, said trichloroethylene containing less than 100 parts per million of water by weight, discontinuing the passage of trichloroethylene through the bed when the activity of the resin bed diminishes, regenerating the resin bed, contacting the bed with a low boiling, liquid, organic oxygen-containing organic compound followed by passing an inert dry gas through the bed whereby to dry the bed and thereafter resuming the passage of such acidic trichloroethylene through the bed.

6. The method which comprises sequentially passing acidic trichloroethylene containing acidity not materially affected by treatment with aqueous alkaline materials through a liquid permeable dried bed of synthetic, organic, anionic ion-exchange resin from which moisture has been removed, whereby to reduce said acidity and contents of aciduous materials not affected by treatment with aqueous alkaline materials, said trichloroethylene containing less than 100 parts per million of water by weight, discontinuing the passage of trichloroethylene when the activity of the resin bed diminishes, regenerating the resin bed by contacting it with an aqueous alkaline medium, drying the regenerated bed to remove moisture therefrom and to establish a bed containing less than 20 percent water by weight, and thereafter resuming the passage of acidic trichloroethylene through the bed.

References Cited in the file of this patent

UNITED STATES PATENTS

| | | |
|---|---|---|
| 2,152,723 | Yabroff | Apr. 4, 1939 |
| 2,566,353 | Mills | Sept. 4, 1951 |
| 2,596,930 | Kaiser | May 13, 1952 |
| 2,663,702 | Kropa | Dec. 22, 1953 |

OTHER REFERENCES

Weissberger: "Tech. of Org. Chem.," vol. III, Interscience Pub., Inc., N.Y. (1950), pages 615, 616 and 633.

"Amberlite Ion Exchange" (pamphlet), September 1953, Rohm and Haas Company, Wash. Square, Phila. 5, Pennsylvania.

UNITED STATES PATENT OFFICE

CERTIFICATE OF CORRECTION

Patent No. 2,888,494                                    May 26, 1959

Lehr F. Kissling

It is hereby certified that error appears in the printed specification of the above numbered patent requiring correction and that the said Letters Patent should read as corrected below.

Column 5, Table 1, last column thereof, for 0
            5.5     read     5.0
            1.                1.5

Signed and sealed this 1st day of March 1960.

(SEAL)
Attest:

KARL H. AXLINE                                 ROBERT C. WATSON
                                                               Commissioner of Patents
Attesting Officer